United States Patent [19]

Ohmura et al.

[11] Patent Number: 6,002,345
[45] Date of Patent: Dec. 14, 1999

[54] ASSURANCE OF INTERCOMMUNICATION AND POSITION RECOGNITION BETWEEN MOBILE STATIONS WITH NAVIGATION APPARATUSES

[75] Inventors: Hiroshi Ohmura, Hatsukaichi; Koji Hosoda, Hiroshima-ken; Hideaki Kikuchi, Hatsukaichi, all of Japan

[73] Assignee: Mazda Motor Corporation, Hiroshima, Japan

[21] Appl. No.: 08/935,702

[22] Filed: Sep. 23, 1997

[30] Foreign Application Priority Data

Sep. 30, 1996 [JP] Japan ................................. 8-259600

[51] Int. Cl.$^6$ ...................................... G08G 1/16
[52] U.S. Cl. .................. 340/903; 340/990; 340/995; 701/213; 701/300
[58] Field of Search .................... 340/903, 961, 340/988, 989, 995, 573, 539, 990; 701/213, 300

[56] References Cited

U.S. PATENT DOCUMENTS

| | | | |
|---|---|---|---|
| 5,170,172 | 12/1992 | Weinstein | 342/458 |
| 5,239,684 | 8/1993 | Ishikura | 455/67.7 |
| 5,289,527 | 2/1994 | Tiedmann, Jr. | 379/59 |
| 5,561,851 | 10/1996 | Hubbell et al. | 455/512 |
| 5,640,144 | 6/1997 | Russo et al. | 340/531 |
| 5,781,119 | 7/1998 | Yamashita et al. | 340/903 |

FOREIGN PATENT DOCUMENTS 8-68650  3/1996  Japan.

*Primary Examiner*—Daniel J. Wu

[57] ABSTRACT

The communication state is evaluated on the basis of the current positions, velocities, and moving directions included in information obtained from another mobile station by radio communications and information of the own mobile station, and the electric field strength Bi of the radio communications (S31 to S34). When the obtained evaluation value is smaller than the relative distance Li between the mobile stations (S35), processing for generating a message in the own mobile station is done in correspondence with the current position (S36 to S42), or processing for generating a message in the other mobile station is done in correspondence with the direction the other mobile station is traveling (S43 to S48).

19 Claims, 17 Drawing Sheets

F I G. 6B
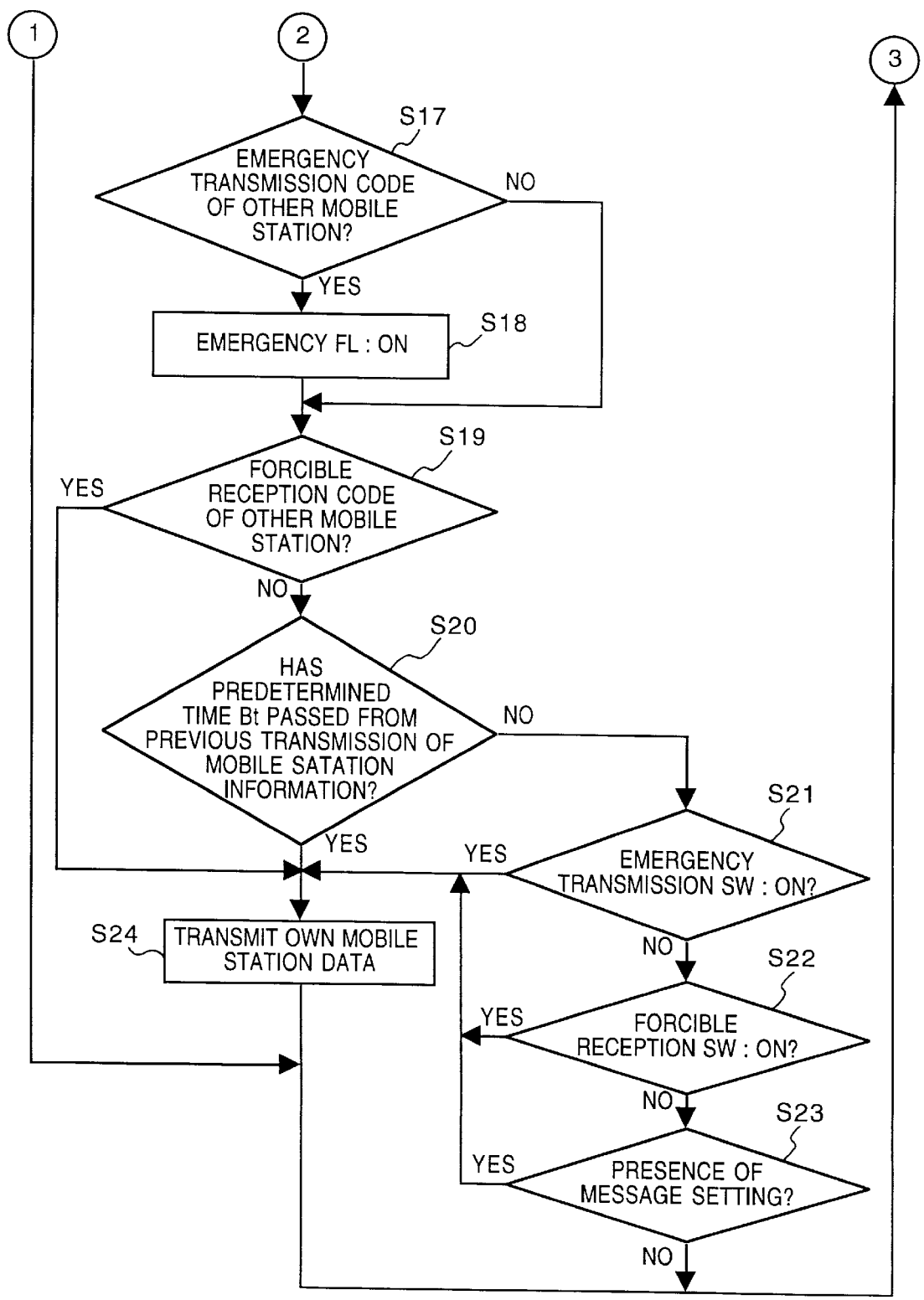

OWN MOBILE STATION (LEFT-END)

OWN MOBILE STATION (HEAD)

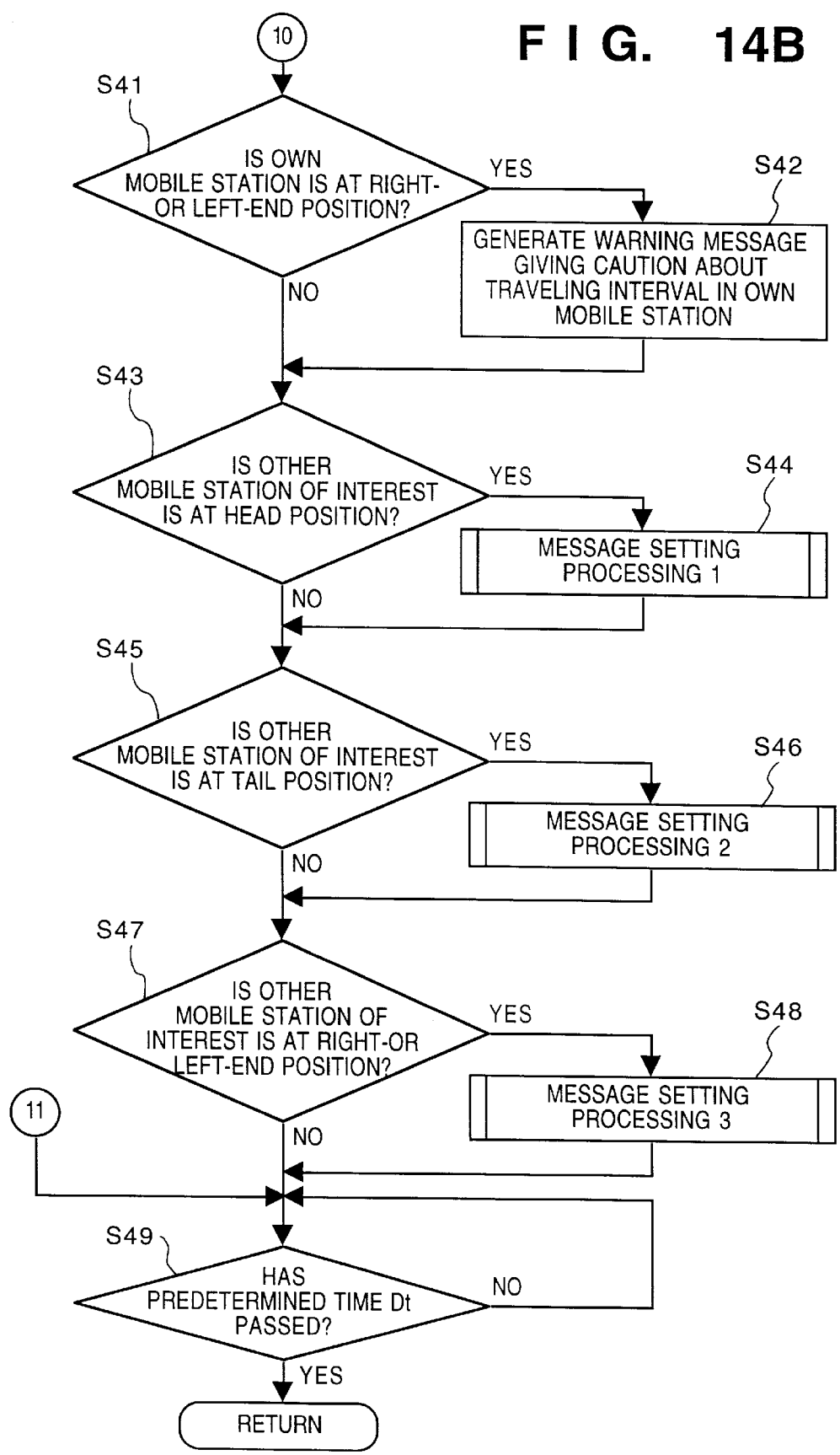

F I G. 17
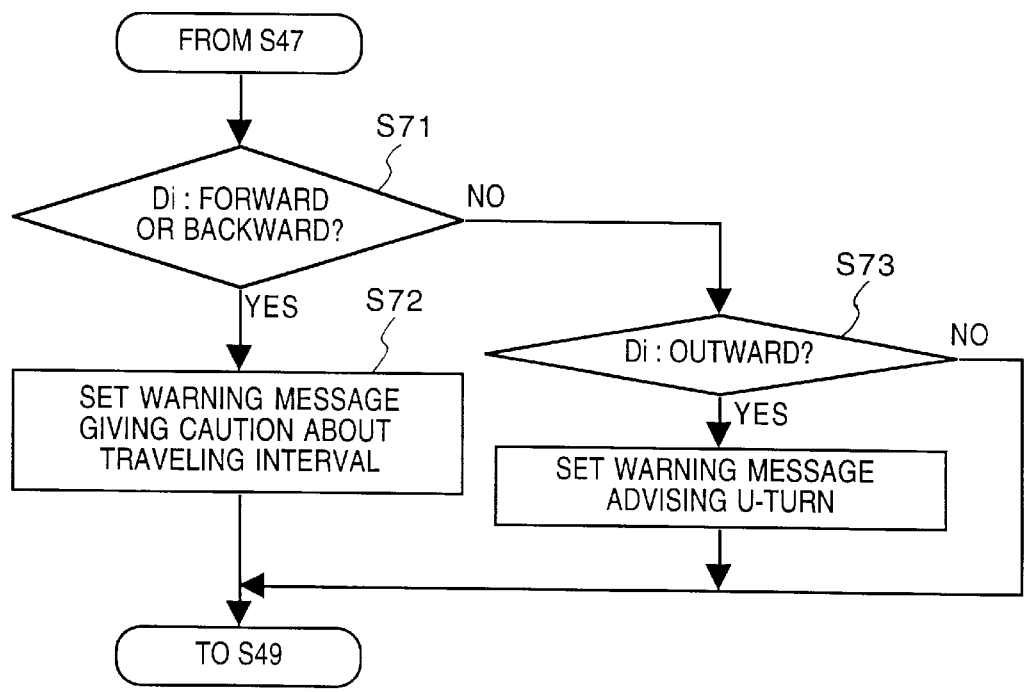

(WHEN OTHER MOBILE STATION OF INTEREST IS LOCATED ON RIGHT SIDE)

ASSURANCE OF INTERCOMMUNICATION AND POSITION RECOGNITION BETWEEN MOBILE STATIONS WITH NAVIGATION APPARATUSES

BACKGROUND OF THE INVENTION

1. Field of the Invention

The present invention relates to a navigation apparatus for performing route search and route guidance to the selected destination and, more particularly, to a navigation apparatus connected with a radio communication equipment, and its navigation method.

2. Description of the Related Art

Navigation apparatuses using the position detection technique based on a GPS (global positioning system) have been remarkably developed. Especially, in recent years, in addition to route guidance to a certain destination, a scheme that allows a plurality of mobile stations each mounting a system built by connecting a navigation apparatus and communication apparatus to exchange each other's position information and messages via the communication apparatuses has been proposed, as disclosed in, e.g., Japanese Patent Laid-Open No. 8-68650.

However, in the above prior art, when the distance between the mobile stations exceeds the communication range of their communication apparatuses, the mobile stations can hardly maintain their communications, and cannot detect each other's position information.

SUMMARY OF THE INVENTION

It is, therefore, an object of the present invention to provide a navigation apparatus connected with a radio communication equipment, and can prevent radio communications between mobile stations that mount such navigation apparatuses from being disrupted, and its navigation method.

In order to achieve the above object, a navigation apparatus of the present invention is characterized by the following arrangement.

That is, there is provided a navigation apparatus to which radio communication means for performing a radio communication between mobile stations is connected, comprising:

distance detection means for detecting a distance between an own mobile station and another mobile station on the basis of information associated with the own mobile station that mounts the own navigation apparatus, and information associated with the other mobile station received by the radio communication means; and warning means for generating a warning when the distance detected by the distance detection means becomes larger than a predetermined value.

For example, the apparatus further comprises:

position recognition means for recognizing positions of the own mobile station and the other mobile station on the basis of the information associated with the own mobile station and the information associated with the other mobile station; and own mobile station end portion detection means for detecting, on the basis of a position recognition result of the position recognition means, if the own mobile station is located at an end portion in a group including the own mobile station and the other mobile station, and when the own mobile station end portion detection means detects that the own mobile station is located at the end portion, the warning means generates a warning in the own mobile station.

With this arrangement, radio communications in the own mobile station can be prevented from being disrupted.

Also, for example, the apparatus further comprises:

position recognition means for recognizing positions of the own mobile station and the other mobile station on the basis of the information associated with the own mobile station and the information associated with the other mobile station; and other mobile station end portion detection means for detecting, on the basis of a position recognition result of the position recognition means, if the other mobile station is located at an end portion in the group including the own mobile station and the other mobile station, and when the other mobile station end portion detection means detects that the other mobile station is located at the end portion, the warning means controls the radio communication means to transmit information associated with a warning to the other mobile station.

With this arrangement, for example, when the own mobile station is not at a head position, it transmits a warning to another mobile station located at the head position so as to make a warning to be produced by the other mobile station redundant together with processing (a warning produced when that station is located at the head position) executed by the other mobile station itself, thus surely informing the operator of the warning.

Furthermore, for example, the apparatus preferably further comprises warning content changing means for changing contents of the warning in accordance with a position of the end portion when the own mobile station is located at the end portion in the group.

With this arrangement, the operator of the own mobile station can be informed of the detailed action he or she is to take depending on whether the position of the own mobile station is the head position, right- or left-end position, or the like.

Moreover, for example, the apparatus preferably further comprises first transmission content changing means for changing contents of the information to be transmitted associated with the warning in accordance with a position of the end portion when the other mobile station is located at the end portion in the group, and also comprises direction detection means for detecting a direction of the other mobile station with respect to the own mobile station on the basis of the information associated with the own mobile station and the information associated with the other mobile station; and second transmission content changing means for changing contents of the information to be transmitted associated with the warning in correspondence with the direction of the other mobile station detected by the direction detection means when the other mobile station is located at the end portion in the group. Alternatively, the apparatus preferably further comprises direction detection means for detecting a direction of the other mobile station with respect to the own mobile station on the basis of the information associated with the own mobile station and the information associated with the other mobile station; and transmission inhibition means for inhibiting transmission of the information to be transmitted associated with the warning when the direction of the other mobile station detected by the direction detection means agrees with a direction toward the own mobile station.

With this arrangement, when the operator of the other mobile station is informed of the action he or she is to take depending on whether the position of the other mobile station is the head position, right- or left-end position, or the like, if the other mobile station is approaching the own mobile station, no warning is produced even if, for example, the other mobile station is located at the head, tail, or right- or left-end position.

Also, in order to achieve the above object, a navigation apparatus of the present invention is characterized by the following arrangement.

That is, there is provided a navigation apparatus to which radio communication means for performing a radio communication between mobile stations is connected, comprising:

electric field strength detection means for detecting an electric field strength of a radio signal received from another mobile station by the radio communication means; and warning means for generating a warning when the electric field strength detected by the electric field strength detection means is smaller than a predetermined value.

Furthermore, the present invention is characterized by a navigation method that can realize the navigation apparatus with the above arrangement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6A and FIG. 6B are flow charts showing the transmission/reception processing in the inter-mobile communications in the navigation apparatus according to the embodiment of the present invention;

FIG. 14A and FIG. 14B are flow charts showing the communication state evaluation processing according to the embodiment of the present invention;

FIG. 17 is a flow chart showing message setting processing 3 in the communication state evaluation processing according to the embodiment of the present invention;

DETAILED DESCRIPTION OF THE PREFERRED EMBODIMENTS

An embodiment in which the present invention is applied to a vehicle as a typical mobile station will be described hereinafter with reference to the accompanying drawings. The hardware arrangement of a navigation apparatus according to an embodiment of the present invention will be described below with the aid of FIG. 1.

Figure 1:
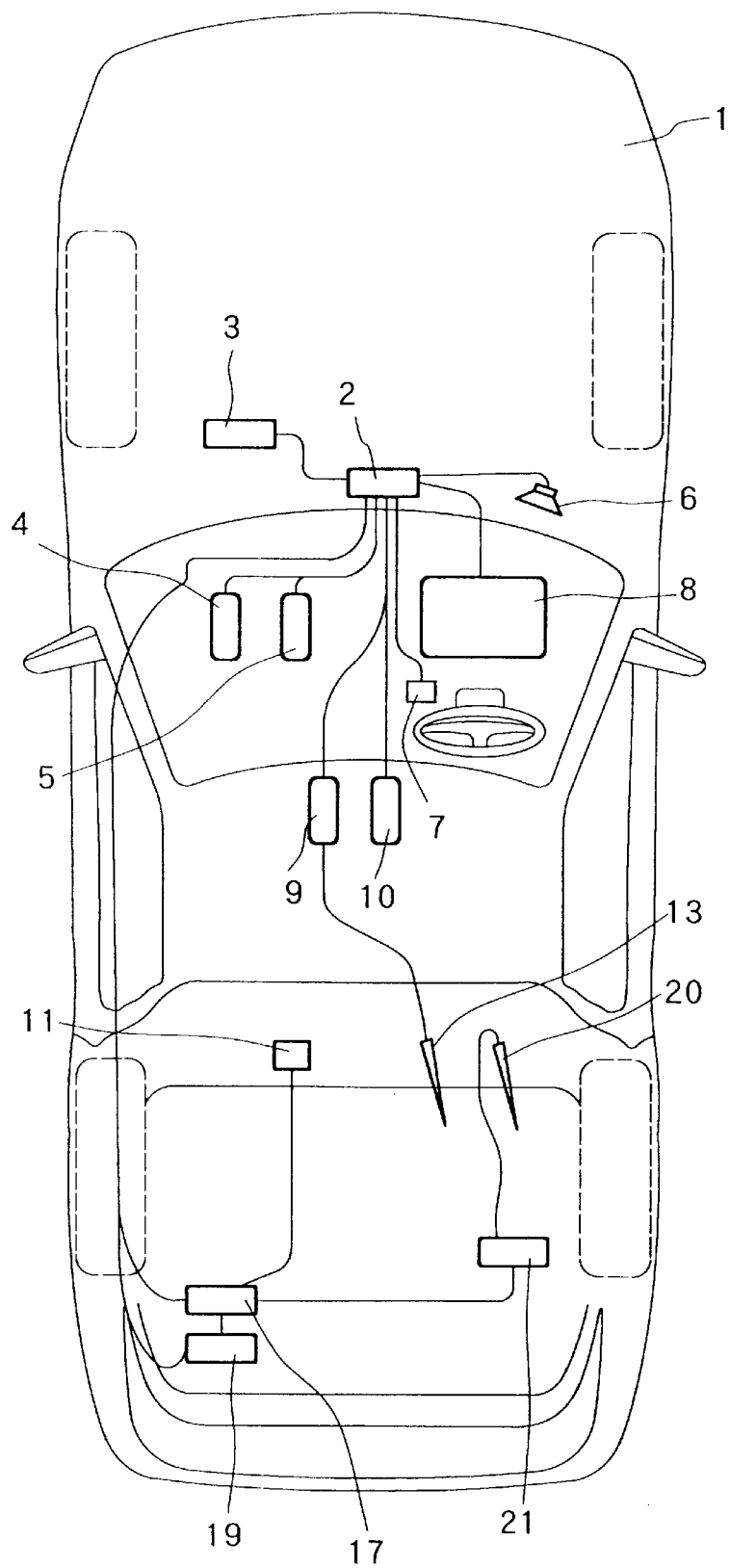
FIG. 1 is a plan view showing an example of the system arrangement in which a navigation apparatus according to an embodiment of the present invention is built in a vehicle.

FIG. 1 shows an example of the system arrangement in which a navigation apparatus according to an embodiment of the present invention is built in a vehicle.

Referring to FIG. 1, reference numeral 2 denotes a central control unit for calculating various data (remaining fuel amount, average fuel consumption, average vehicle velocity, and the like) associated with the traveling state of the vehicle, and systematically controlling the following arrangement. Reference numeral 3 denotes a vehicle-mounted LAN unit for controlling so-called local area network communications among sensors and drivers (not shown) required for controlling, e.g., an anti-lock brake system (ABS), 4-wheel drive control, and the like, and the central control unit 2. Reference numeral 4 denotes a RAM card drive, which is a data reader/writer of a RAM card which stores information such as a seat position, mirror positions, and the like associated with a specific operator. Reference numeral 5 denotes a data drive which is a reader/writer of various kinds of information stored in data storage media such as an FD, MD, PD, and the like. Reference numeral 6 denotes a voice guide loudspeaker that outputs voice information from a navigation controller 17 via a voice output interface in the central control unit 2. Reference numeral 7 denotes a microphone, which inputs a voice instruction of the operator to the navigation controller 17 via a voice recognition interface (not shown) in the central control unit 2. Reference numeral 8 denotes a display such as a liquid crystal display, which displays a navigation screen, various input operation screens, and the states (vehicle velocity, air conditioner setting state, and the like) of the vehicle. Furthermore, the display 8 comprises, on its front surface, for example, a capacitive or infrared type input device which allows a touch input operation. Note that of those displayed on the display 8 information always required during travel may be displayed on a so-called head-up display (not shown). Reference numeral 9 denotes a mobile telephone as a vehicle-mounted telephone, to which a telephone antenna 13 is connected. Reference numeral 10 denotes an operation switch, which is used for making input operations to the central control unit 2 and the-navigation controller 17. Reference numeral 17 denotes a navigation controller, which searches for an appropriate route to the destination designated by the operator using, e.g., the operation switch 10 on the basis of position information from a GPS (global positioning system) antenna 11 and map information in a CD-ROM loaded in a CD-ROM changer 19, and offers a navigation guide by means of a display on the display 8 and a voice output from the voice guide loudspeaker 6. The map information in the CD-ROM read out by the CD-ROM changer 19 is basic information among those displayed on the display 8.

Furthermore, the navigation controller 17 is connected to a radio transmitter/receiver 21, to which a radio antenna 20 is connected, as shown in FIG. 1, and performs data communications between vehicles (to be described later).

More preferably, the navigation controller 17 is connected to an FM tuner for receiving an FM multiplexed broadcast compatible with VICS (Vehicle Information Communication System), and a beacon signal receiver for receiving a radio wave beacon signal and an optical beacon signal, and displays information obtained by them as traffic control information (so-called VICS information) on the display 8 so as to use such information as a route search condition (limiting condition) upon route guidance. Furthermore, local information of local areas around the route of travel may be acquired via the data drive 5 or mobile telephone 9, and may be used in the display information. Since the method of detecting the position of the own vehicle by the GPS is known to those who are skilled in the art, a detailed description thereof will be omitted.

Various features of software of the navigation apparatus according to the embodiment of the present invention will be described below.

Update Display Screen

Figure 2:
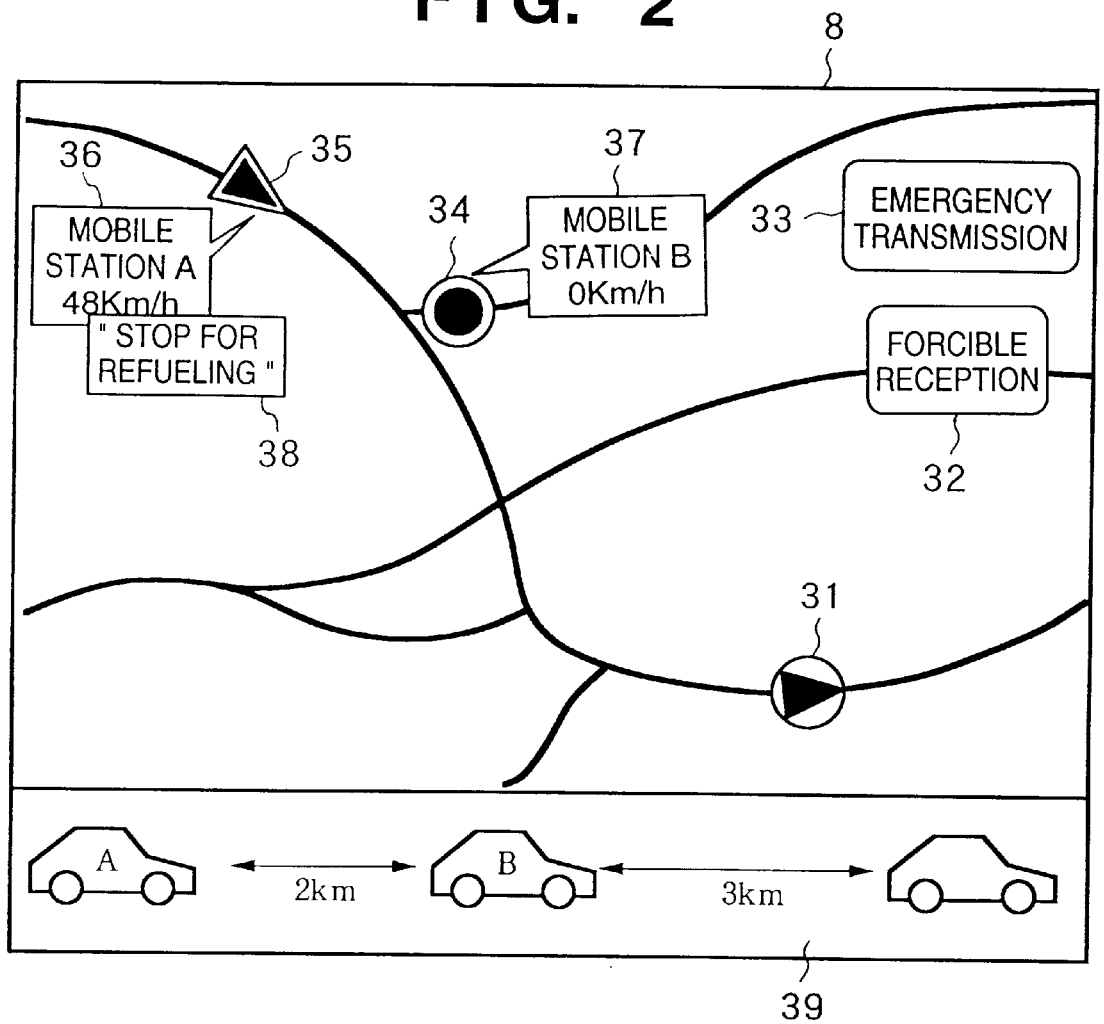
FIG. 2 is a view showing a display example on a display of the navigation apparatus according to the embodiment of the present invention.

FIG. 2 shows a display example on the display of the navigation apparatus according to the embodiment of the present invention.

In FIG. 2, the display 8 displays an own mobile station 31 and another mobile station 35 on the displayed route, and their traveling directions are indicated by arrows. Another mobile station 34 is at rest. Reference numerals 36 to 38 denote data obtained from other mobile stations via inter-mobile communications (to be described later). The operator turns on a forcible reception switch 32 when he or she wants to know the latest current positions of other mobile stations. When this switch is turned on, a communication other than those at predetermined time periods (to be described later) is started, and the display screen is updated based on the latest position information of other mobile stations. The operator turns on an emergency transmission switch 33 when he or she stops the own mobile station for some reason or when all the members of his or her group are to meet together. When this switch is turned on, a communication other than those at predetermined time periods (to be described later) is started, and predetermined messages "Wait a moment!", "Let's get together!", and the like, which are registered in advance, are displayed on the displays of other mobile stations. Note that an arbitrary message input by the input device of another mobile station or a voice message input via a microphone can also be displayed (the voice output of the voice guide loudspeaker 6 may be used together), as indicated by a message 38. Reference numeral 39 denotes a window that illustrates and displays the positional relationship among the mobile stations on the basis of the position relationship of other mobile stations obtained by inter-mobile communications (to be described later). In FIG. 2, the other mobile station 34 (B) is stopped at a position 3 km behind the own mobile station 31, and the other mobile station 35 (A) is traveling at a position 2 km behind the mobile station B at 48 km/h. Note that the distance between the mobile stations is preferably the one calculated by interpolation based on map matching, but may be the one calculated from position (coordinate) information between two points in consideration of the load on arithmetic processing.

Note that the display colors of these displayed elements on the screen are changed in correspondence with changes in state, or they are emphasized by, e.g., flickering.

The updating processing of the contents on the screen of the display 8 that implements the above-mentioned operation on the display screen will be explained below with reference to FIG. 3.

Figure 3:
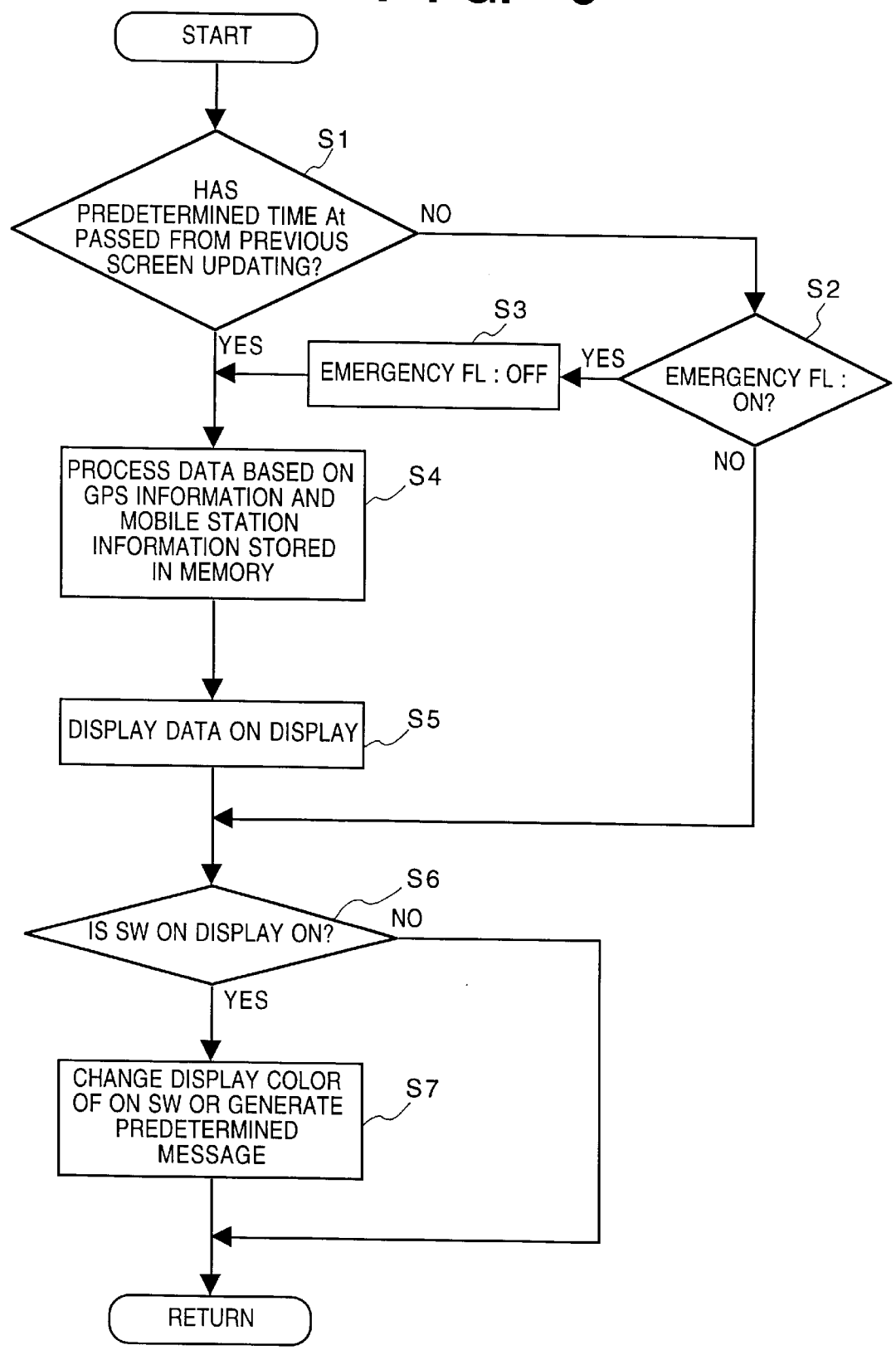
FIG. 3 is a flow chart showing the updating processing of the contents displayed on the screen in the navigation apparatus according to the embodiment of the present invention.

FIG. 3 is a flow chart showing the updating processing of the contents on the display screen in the navigation apparatus according to the embodiment of the present invention. The processing starts when the navigation apparatus is enabled.

Referring to FIG. 3, it is checked if a predetermined time At has passed from the previous screen updating timing (step S1). If NO in step S1, it is checked if an emergency FL is ON (step S2).

Note that the emergency FL is a processing flag which is exchanged with transmission/reception processing (FIG. 6; to be described later). When the emergency transmission switch 33 (FIG. 2) is turned on on the display 8 of the navigation apparatus mounted on another mobile station, and the own mobile station receives the associated data via inter-mobile data communications (to be described later), this flag is used for displaying the predetermined message, which is registered in advance, on the display 8 irrespective of a predetermined screen updating period.

If NO in step S2, the flow advances to step S6; if YES in step S2, the emergency FL is turned off in step S3, and the flow advances to step S4. On the other hand, if YES in step S1, the current positions, traveling directions, and the distances between adjacent mobile stations of the own mobile station and other mobile stations, and the like are calculated on the basis of the latest GPS information stored in an internal memory (not shown; RAM) of the navigation controller 17 and information (to be referred to as mobile station information hereinafter) received via communications with the other mobile stations, and the calculated data are displayed on the display 8 together with associated text data (steps S4 and S5). When evaluation processing (to be described later) between the own mobile station and the other mobile station of interest determines that a warning message is to be displayed, the message is displayed on the display 8 in these steps S4 and S5. It is then checked if the forcible reception switch 32, emergency transmission switch 33, or another switch (not shown) on the display 8 is turned on (step S6). If NO in step S6, the flow returns to step S1; if YES in step S6, the display color of the ON switch is changed, and a predetermined message, e.g., "start ○○○○", is displayed (step S7). Thereafter, the flow returns to step S1.

Inter-mobile Communication

The inter-mobile communications between the own mobile station and other mobile stations will be explained below.

Figure 4:
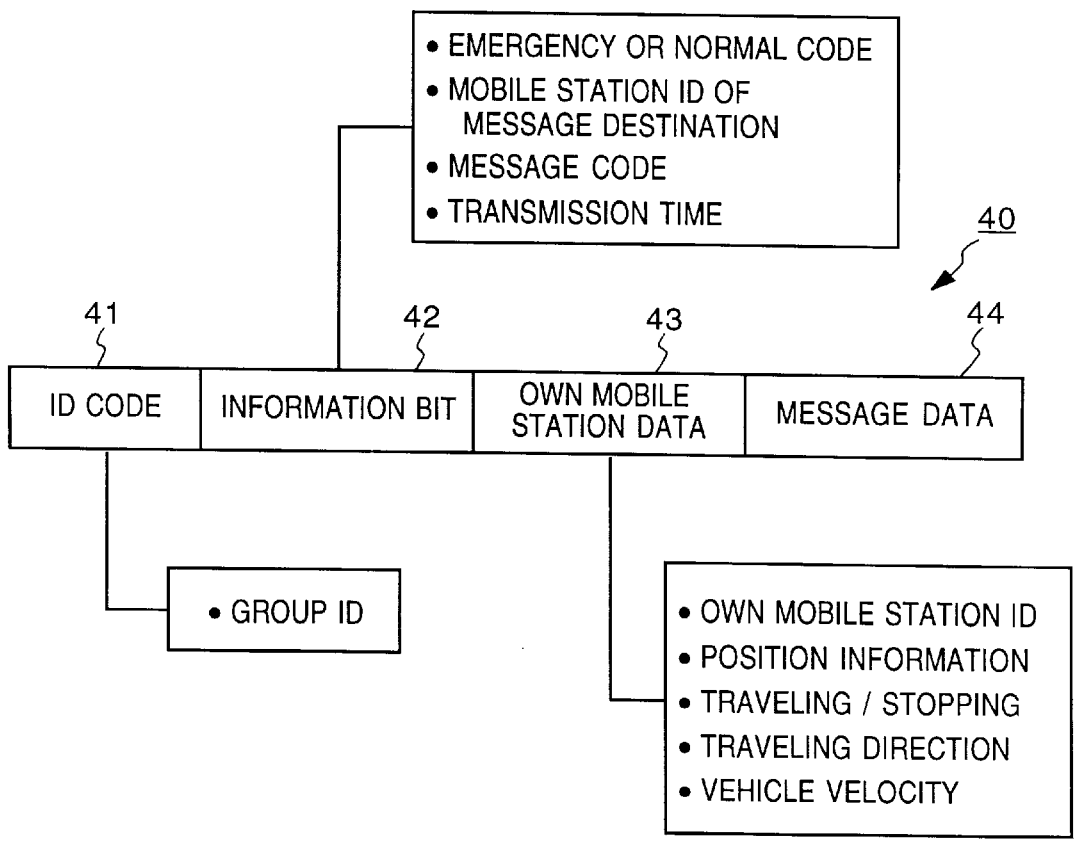
FIG. 4 shows the data format for inter-mobile communications between navigation apparatuses according to the embodiment of the present invention.

FIG. 4 shows the data format of the inter-mobile communications between navigation apparatuses. By transmitting/receiving this data format between mobile stations, the inter-mobile communications are realized.

In FIG. 4, a data format 40 is made up of the following fields.

ID code 41: a group ID that identifies an own group including the own mobile station and at least one other mobile station.

Information bit 42: including a code representing if data after this field is an emergency one, a mobile station ID of a destination of a message (to be described later), a message code indicating the contents of the message, and a transmission time.

Own mobile station data 43: including an own mobile station ID, current position information of the own mobile station, a traveling/stopping code, a traveling direction, and a vehicle velocity.

Message data 44: text data as an arbitrary message input by the input device of the display 8 or a voice message input via the microphone.

Figure 5:
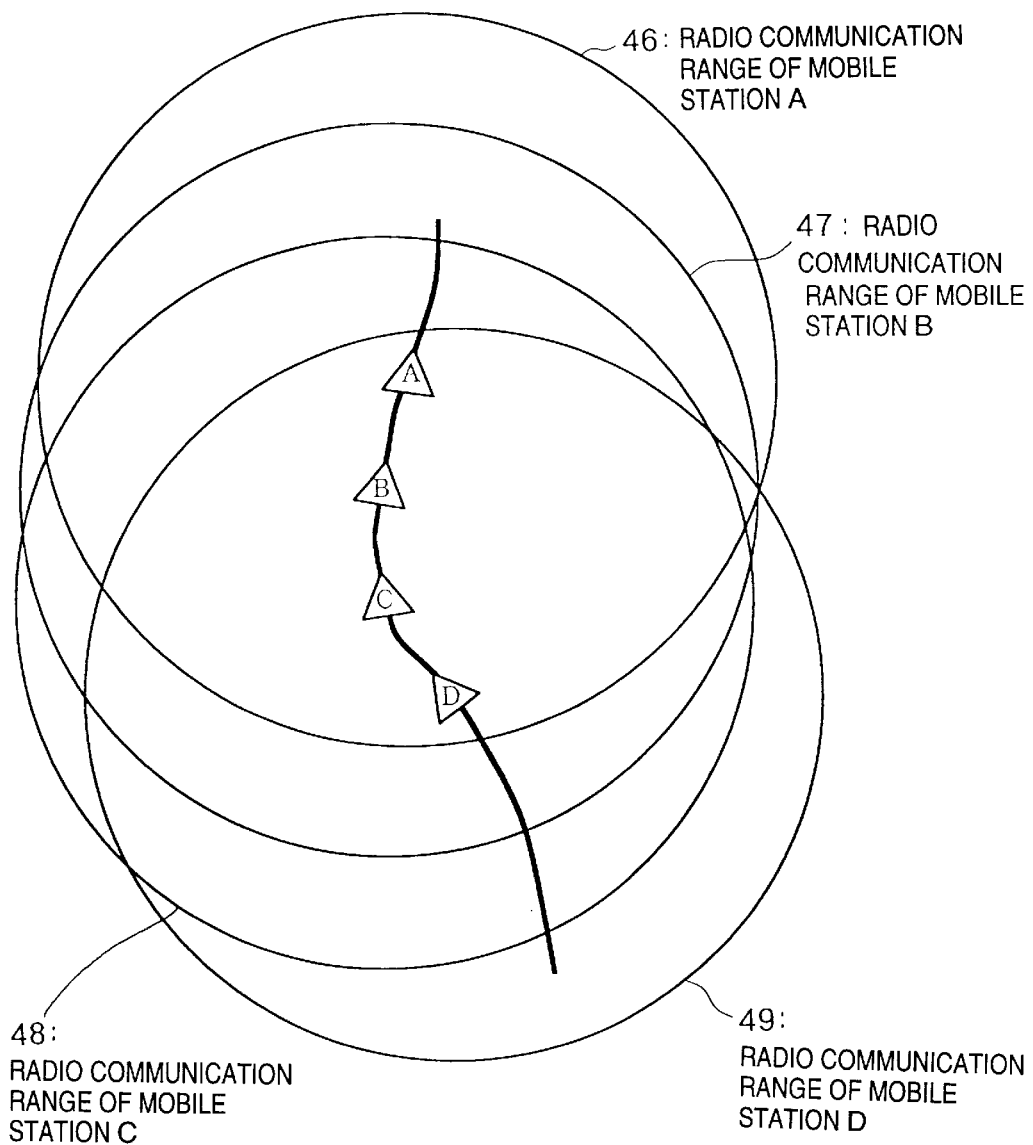
FIG. 5 is a view for explaining the state wherein inter-mobile radio communications are made among a plurality of mobile stations by the navigation apparatus according to the embodiment of the present invention.

FIG. 5 is a view for explaining the state wherein inter-mobile radio communications are being performed among a plurality of mobile stations by the navigation apparatus according to the embodiment of the present invention.

In FIG. 5, mobile stations A to D are traveling on a given route. Reference numeral 46 to 49 denote the radio communication ranges of the individual mobile stations. Note that the actual radio communication range normally has a complicated pattern depending on the environment around the apparatus. Since each mobile station transmits its own mobile station information on the basis of the data format shown in FIG. 4, the display 8 of the navigation apparatus mounted on the mobile station displays each other's positions and traveling states.

Figure 6A:
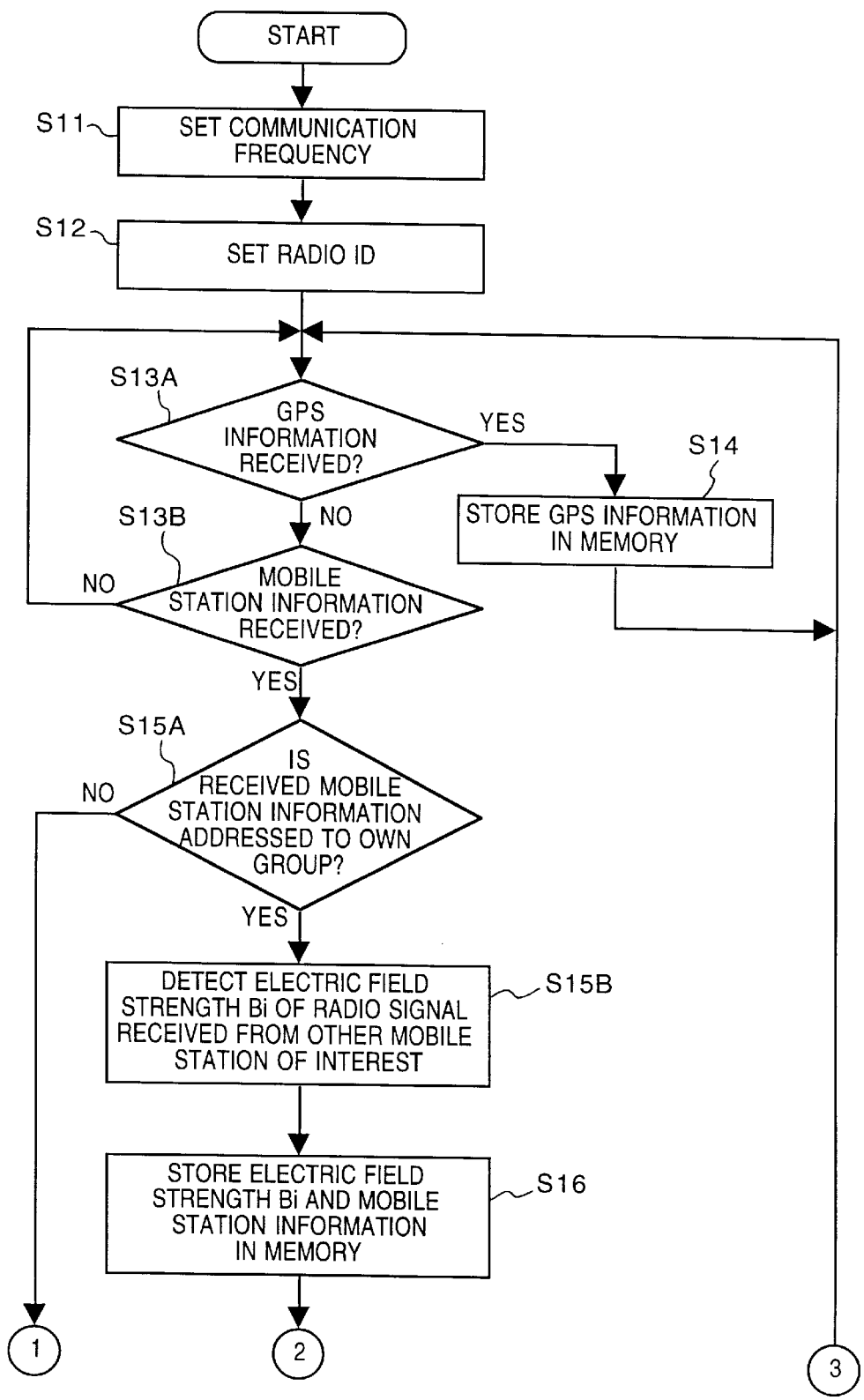

FIG. 6A and FIG. 6B are flow charts showing the transmission/reception processing in the inter-mobile communications in the navigation apparatus according to the embodiment of the present invention. The processing starts when the navigation apparatus is enabled.

In FIG. 6A and FIG. 6B, the radio communication frequency with other mobile stations is set in step S11. In step S12, the mobile station ID for radio communications is set. These setting operations preferably require simple confirmation alone when data are not changed since such data are rarely changed in normal use.

Steps S13A to S24 form a transmission/reception routine. It is checked if GPS information is received (step S13A). If YES in step S13A, the received GPS information is stored in the memory (step S14), and the flow returns to step S13A. On the other hand, if NO in step S13A, it is checked if mobile station information is received (step S13B). If NO in step S13B, the flow returns to step S13A. On the other hand, if YES in step S13B, the received mobile station information is interpreted on the basis of the data format shown in FIG. 4 to check if that information is addressed to the own group (step S15A). If YES in step S15A, an electric field strength Bi of a radio signal from that mobile station is detected (step S15B), and the detected electric field strength (data) Bi and the received mobile station information are stored in the memory (step S16). It is then checked if the mobile station information includes an emergency transmission code which is set when the emergency transmission switch 33 was turned on at the other mobile station (step S17). If YES in step S17, the above-mentioned emergency FL is turned on (step S18: with this processing, the predetermined message such as "Wait a moment!", "Let's get together!", or the like, which are registered in advance, is displayed on the display 8 of the own mobile station), and it is checked if the mobile station information includes a forcible reception code set when the forcible reception switch 32 was turned on at the other mobile station (step S19). If NO in step S17, the flow directly advances to step S19. If NO in step S19, it is checked in step S20 if a predetermined time Bt has passed from the previous transmission of mobile station information. On the other hand, if YES in step S19, since transmission must be done before the predetermined time Bt passes, the flow advances to step S24.

If NO in step S20, it is checked if the operator has turned on the emergency transmission switch 33 on the display 8 of the own mobile station (step S21). If YES in step S21, the predetermined message is added to message data 46, and the data is transmitted on the basis of the data format shown in FIG. 4 (step S24). Thereafter, the flow returns to step S13A. If YES in step S20, the own mobile station data is transmitted on the basis of the data format shown in FIG. 4 (step S24), and the flow returns to step S13A. On the other hand, if NO in step S21, it is checked if the operator turns on the forcible reception switch 32 on the display 8 of the own mobile station (step S22). If YES in step S22, a forcible reception code is added, and is transmitted together with mobile station data (step S24), and the flow returns to step S13A. On the other hand, if NO in step S22, it is checked if setting of a message (code) to be transmitted by processing in FIGS. 14A to 17 (to be described later) remains (step S23). If NO in step S23, the flow returns to step S13A. On the other hand, if YES in step S23, a message (code) is added to the information bit field 42 in the data format 40, and is transmitted together with the own mobile station data (step S24). Thereafter, the flow returns to step S13A. If NO in step S15A, the flow returns to step S13A.

Communication State Evaluation Between Mobile Stations

The communication state evaluation processing between mobile stations, which is done based on information of other mobile stations obtained by the above-mentioned inter-mobile communications, and information of the own mobile station, will be described below with reference to FIGS. 7 to 17. Simply stated, in this communication state evaluation processing, the state of travel is evaluated using the information of other mobile stations obtained by the above-mentioned inter-mobile communications and the information of the own mobile station, and the communication state is evaluated on the basis of the electric field strength of radio communications. In accordance with these evaluation results, the distance between adjacent mobile stations, and the traveling directions, the operator of the navigation apparatus mounted on the own mobile station and/or the other mobile station of interest is informed of a message of such information, thereby preventing radio communications between the mobile stations from being disrupted.

The parameters, i.e., the relative velocity and electric field strength used in evaluation of the communication state will be explained below with reference to FIGS. 7 to 9.

Figure 7:
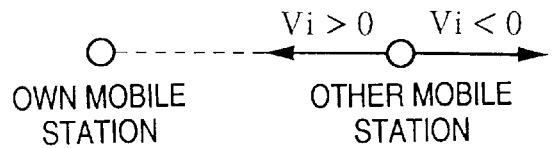
FIG. 7 is a view for explaining the velocity relationship between the own mobile station and another mobile station upon relative movement according to the embodiment of the present invention.

FIG. 7 is a view for explaining the velocity relationship upon relative movement between the own mobile station and the other mobile station according to the embodiment of the present invention. When the other mobile station is moving toward to the own mobile station, a relative velocity Vi>0; when the other mobile station is moving away from the own mobile station, the relative velocity Vi<0.

Figure 8:
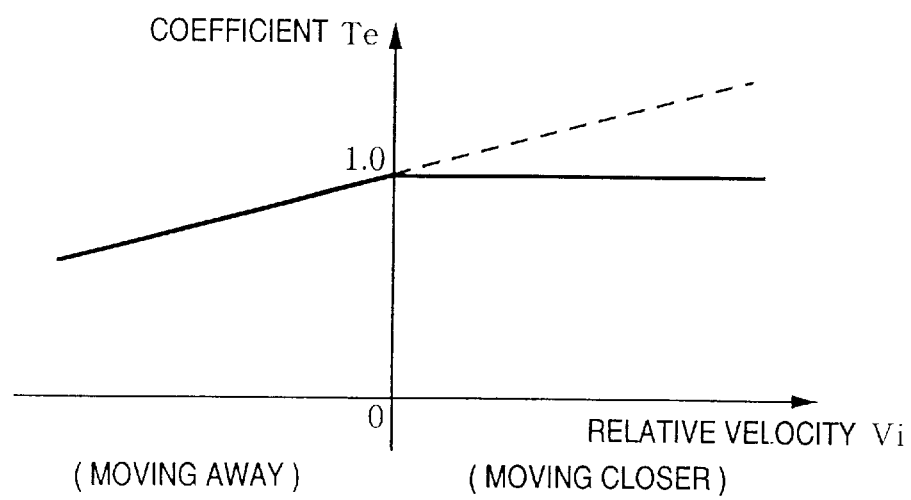
FIG. 8 is a graph showing the coefficient characteristics of the relative velocity used in an evaluation formula according to the embodiment of the present invention.

FIG. 8 shows the coefficient characteristics of the relative velocity used in an evaluation formula according to the embodiment of the present invention. In FIG. 8, the abscissa plots the above-mentioned relative velocity Vi, and the ordinate plots a coefficient Te. In order to indicate that the communication state becomes worse as the evaluation value obtained by an evaluation formula K (to be described later) becomes smaller, the characteristics indicated by the solid line in FIG. 8 are set. When the mobile stations are moving toward each other, the characteristics indicated by the broken line may be set.

Figure 9:
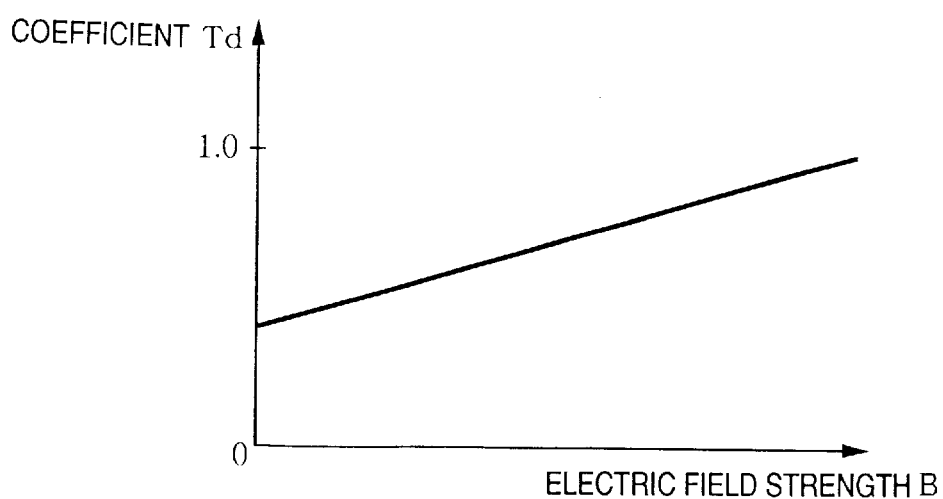
FIG. 9 is a graph showing the coefficient characteristics of the electric field strength used in an evaluation formula according to the embodiment of the present invention.

FIG. 9 shows the coefficient characteristics of the electric field strength used in the evaluation formula according to the embodiment of the present invention. In FIG. 9, the abscissa plots an electric field strength B of a signal received from another mobile station via radio communications, and the ordinate plots a coefficient Td. In order to show that the communication state becomes worse as the evaluation value obtained by the evaluation formula K (to be described later) becomes smaller, the characteristics indicated by the solid line in FIG. 9 are set. Since the electric field strength changes when the mobile station move relative to each other, the abscissa in FIG. 9 may plot the change rate of the electric field strength.

The evaluation formula K of the communication state according to this embodiment using these coefficients is:

$$K = Td \times Te \times k \text{ (constant)}$$

When a relative distance L between two mobile stations is larger than the value given by the evaluation formula K, since radio communications are likely to be disrupted soon, a message is offered by means of a voice output from the voice guide loudspeaker 6 and/or a display on the display 8.

Position Recognition Between Mobile Stations

An example of a position recognition scheme between mobile stations, which is used in software processing (to be described later) and detects the position of the mobile station of interest (the own mobile station or the other mobile station) in the own group including the own mobile station and other mobile stations will be explained below.

FIGS. 10 to 13 are views for explaining position recognition between mobile stations according to the embodiment of the present invention.

Figure 10:
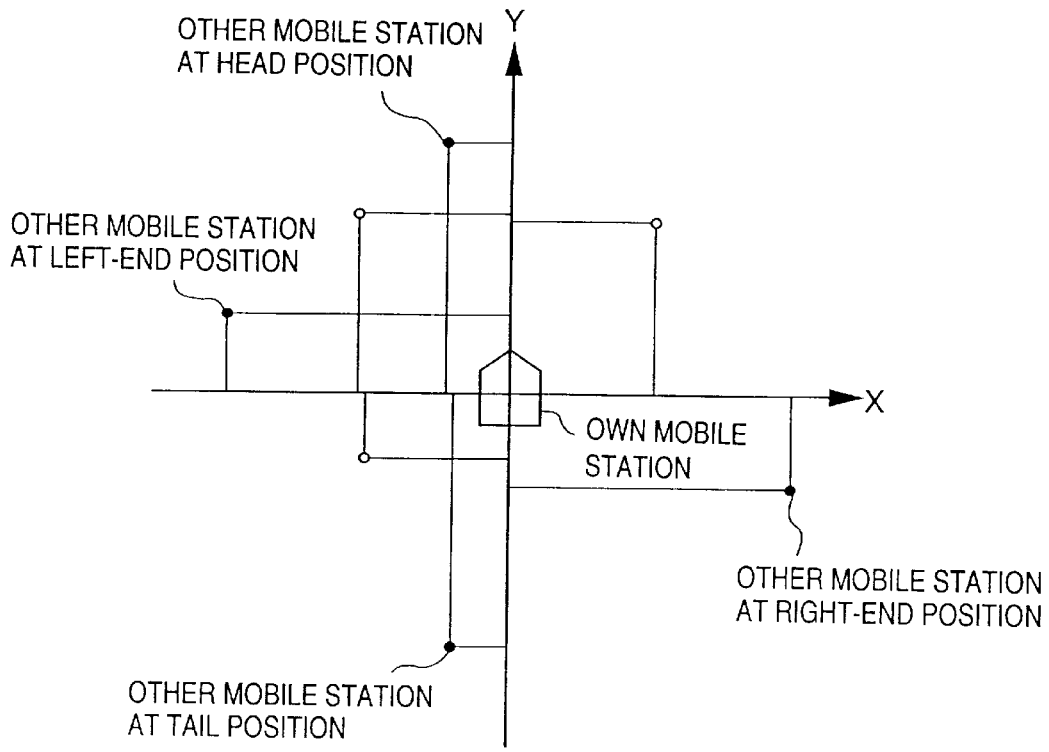
FIG. 10 is a chart for explaining position recognition among mobile stations according to the embodiment of the present invention.

In FIG. 10, assume that the own mobile station is located at the origin of an X-Y coordinate system, and the full and open dots indicate other mobile stations in the own group. Since the position information of each mobile station can be acquired by the GPS function and the above-mentioned inter-mobile communications, the positions of other mobile stations are recognized on the basis of the acquired position information with reference to the position of the own mobile station as the origin position. At end positions in FIG. 10, i.e., at "head", "tail", and "right-end and left-end" positions, mobile stations are indicated by full dots. In the illustrated positional relationship, i.e., when the own mobile station is not located at one end portion in the own group, other "head", "tail", and "right-end and left-end" mobile stations can be recognized as follows. That is, to recognize the "head" mobile station, a mobile station which has a maximum Y-coordinate value among those of other mobile stations can be selected; to recognize the "left-end" mobile station, a mobile station which has a minimum X-coordinate value can be selected.

Figure 11:
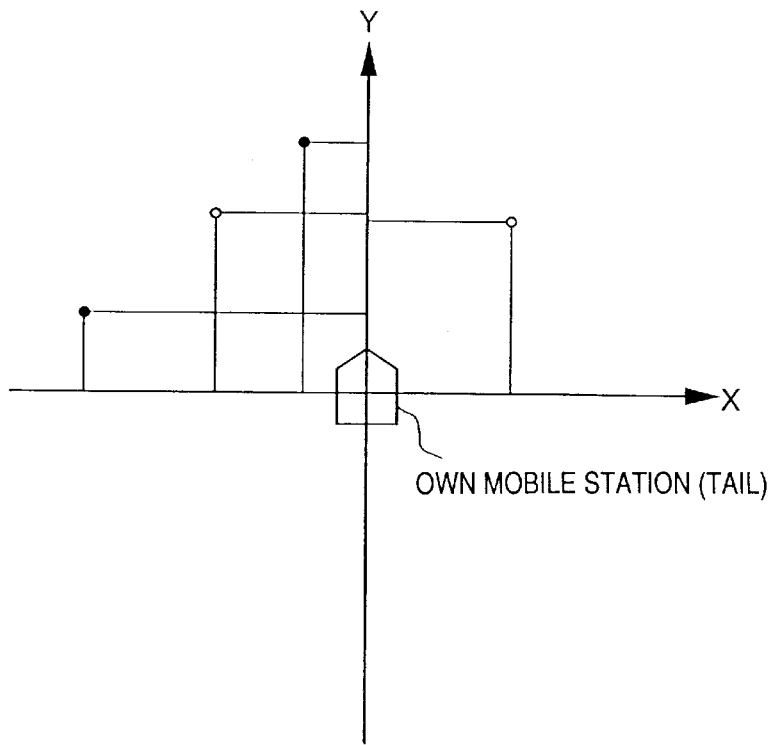
FIG. 11 is a chart for explaining position recognition among mobile stations according to the embodiment of the present invention.
Figure 12:
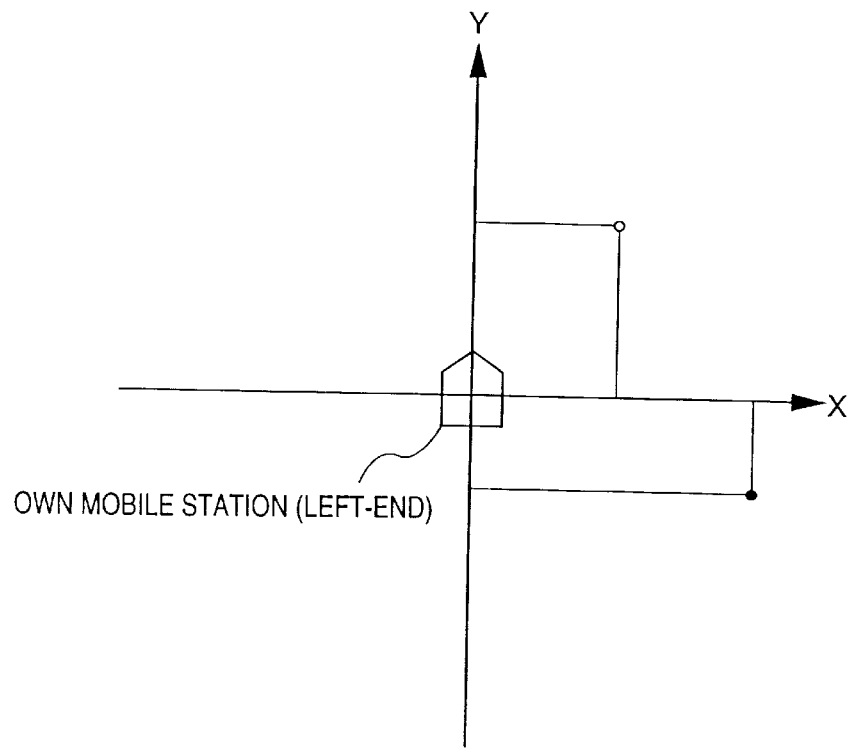
FIG. 12 is a chart for explaining position recognition among mobile stations according to the embodiment of the present invention.
Figure 13:
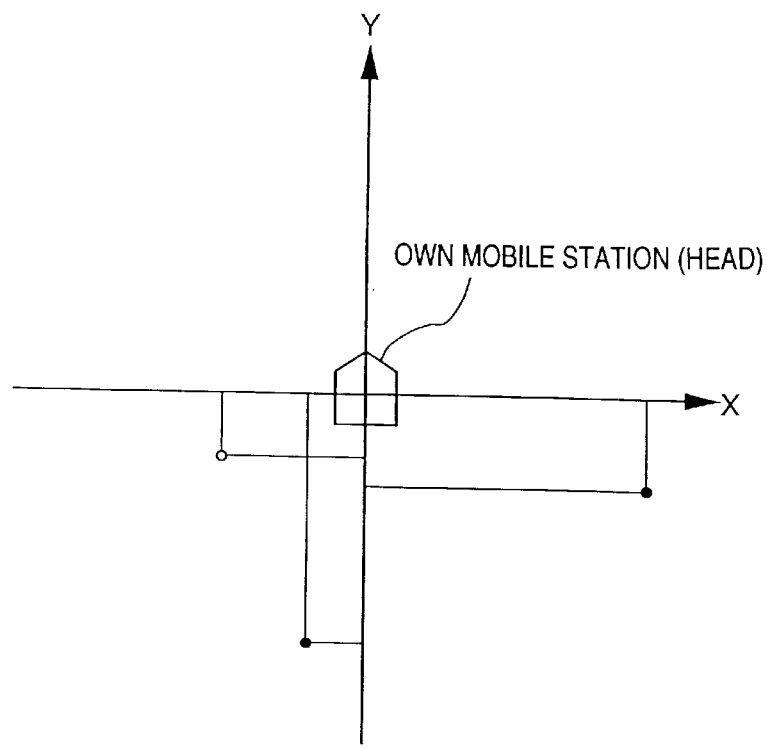
FIG. 13 is a chart for explaining position recognition among mobile stations according to the embodiment of the present invention.

FIGS. 11 to 13 show a case wherein the own mobile station is located at one end portion of the own group. In this case, in order to recognize whether the own mobile station is a "head", "tail", or "right-end or left-end" mobile station, the following determination can be made.

"Tail" (FIG. 11): the own mobile station has a minimum Y-coordinate value (0) among those of the mobile stations in the group.

"Left-end" (FIG. 12): the own mobile station has a minimum X-coordinate value (0) among those of the mobile stations in the group (or a maximum value in the case of the "right-end" mobile station).

"Head" (FIG. 13): the own mobile station has a maximum Y-coordinate value (0) among those of the mobile stations in the group.

A software program that implements the above-mentioned processing will be described below with reference to FIGS. 14A to 20.

Figure 14A:
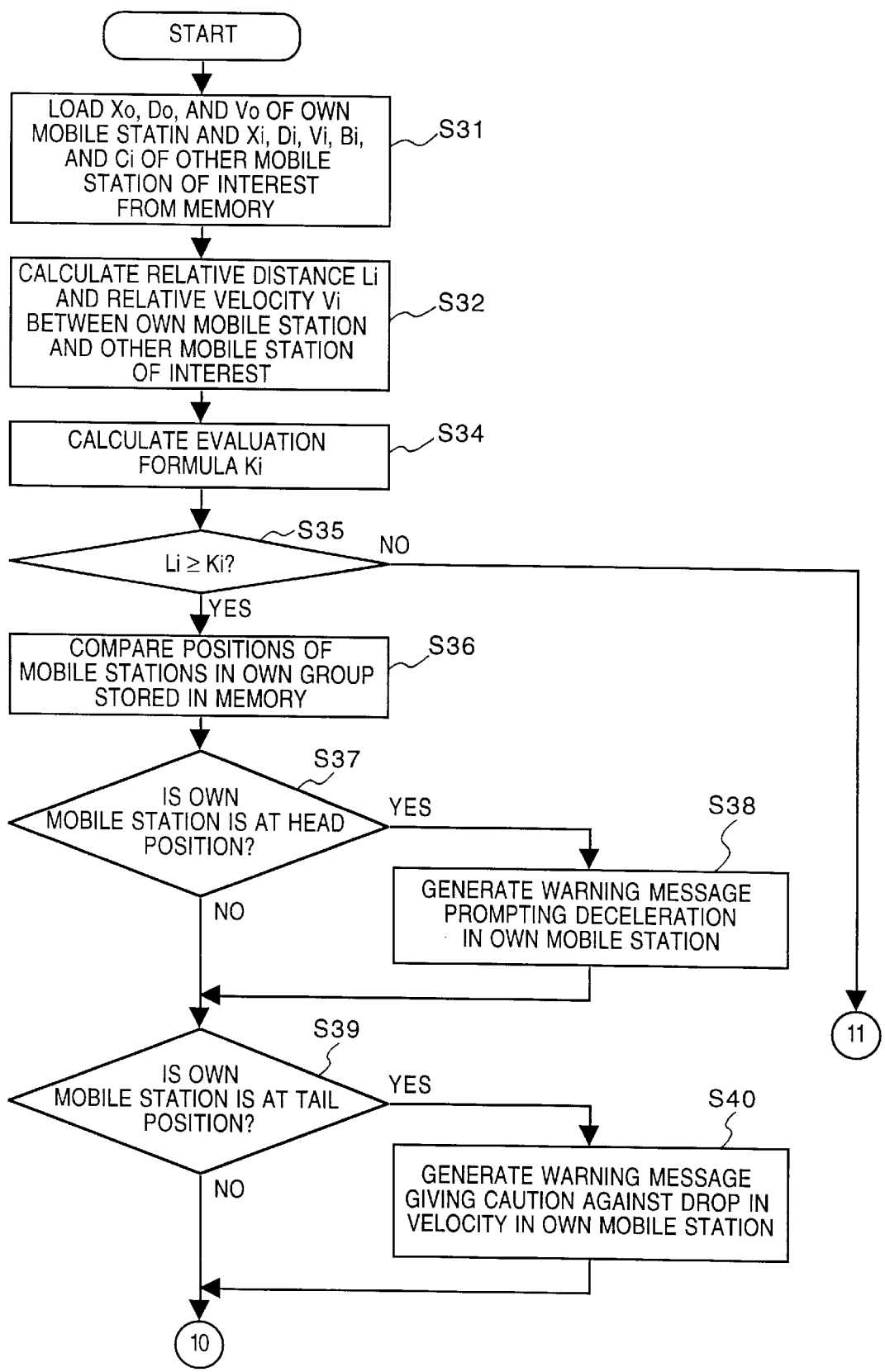

FIG. 14A and FIG. 14B are flow charts showing the communication state evaluation processing according to the embodiment of the present invention. This processing starts when the navigation apparatus is enabled. This processing is done for each of other mobile stations in the group to which the own mobile station belongs.

In FIG. 14, the latest current position X0, traveling direction Do, and velocity Vo of the own mobile station, and the current position Xi, traveling direction Di, velocity Vi, electric field strength Bi, and identification code Ci of the other mobile station of interest, which are stored in the memory in steps S14 and S16 in FIG. 6, are loaded (step S31), and a relative distance Li and a relative velocity Vi between the own mobile station and the other mobile station of interest are calculated on the basis of the loaded information (step S32). Then, an evaluation value Ki is calculated by the evaluation formula K with the aid of FIGS. 8 and 9 (step S34). In step S35, it is checked if the relative distance Li between the own mobile station and the other mobile station of interest is larger than the evaluation value Ki. If NO in step S35, a good communication state is determined, and the flow jumps to step S49 (to be described later). On the other hand, if YES in step S35, since radio communications with the other mobile station of interest are about to be interrupted, the following processing is performed.

In step S36, the positions of the individual mobile stations in the own group are compared on the basis of their current positions stored in the memory. As a result of comparison, if it is determined that the own mobile station is located at the head position in the own group, a warning message prompting deceleration is issued in the own mobile station so as not to leave the other mobile station of interest behind any more (steps S37 and S38). On the other hand, if it is determined that the own mobile station is located at the tail position in the own group, a warning message giving caution against a drop in traveling velocity is issued in the own mobile station so as not to be left behind the other mobile station of interest any more (steps S39 and S40). Also, if it is determined that the own mobile station is located at the right- or left-end position in the own group, a warning message prompting exercising caution about the interval from the other mobile station of interest is issued in the own mobile station (steps S41 and S42). Subsequently, in order to generate a similar message in the other mobile station of interest, message setting processing steps 1 to 3 (FIGS. 15 to 17; to be described later) are executed in correspondence with the position of the other mobile station of interest, i.e., the head, tail, or right- or left-end position (steps S43 to S48). These processing steps are repeated at a predetermined time interval Dt (step S49). Since this evaluation processing is done in each mobile station belonging to the own group, a message generated in the own mobile station by its own processing may overlap that included in information acquired from the other mobile station of interest via communications. However, such overlapping messages can reduce the probability of message signaling failures due to some causes such as a communication state in terms of fail safe.

Figure 15:
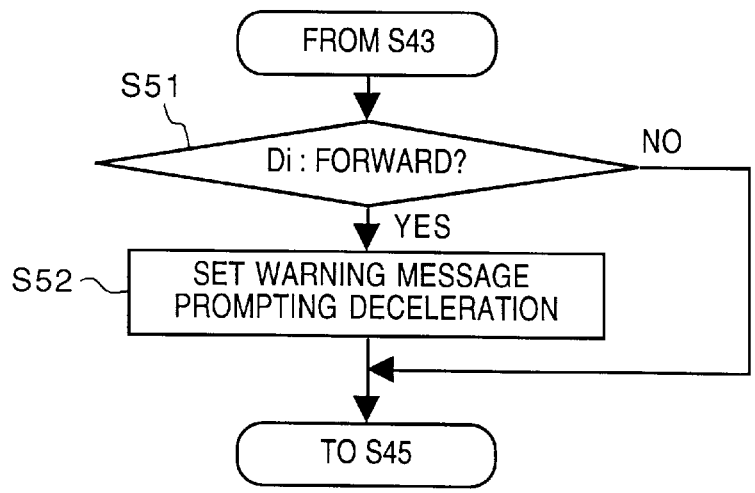
FIG. 15 is a flow chart showing message setting processing 1 in the communication state evaluation processing according to the embodiment of the present invention.

FIG. 15 is a flow chart showing message setting processing 1 in the communication state evaluation processing according to the embodiment of the present invention.

In FIG. 15, it is checked if the traveling direction Di of the other mobile station of interest is the forward direction (step S51). If YES in step S51, a predetermined code is set in a transmission buffer to generate a warning message prompting deceleration in the other mobile station of interest (step S52), and the flow advances to step S45. On the other hand, if NO in step S51, although the other mobile station of interest is located at the head position in the own group, since it is traveling in a direction to approach the own mobile station, the flow advances to step S45. The method of determining the "forward" direction in message setting processing 1 will be explained below with reference to FIG. 18.

Figure 18:
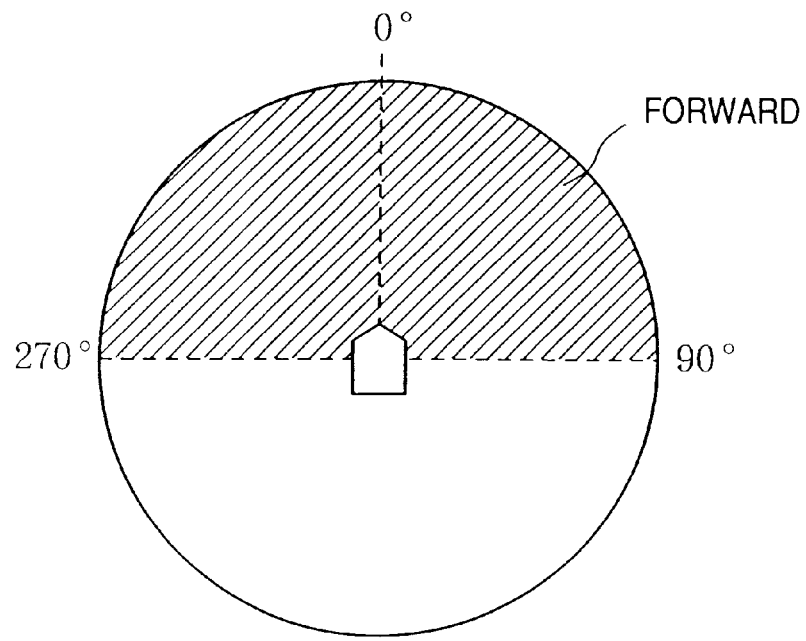
FIG. 18 is a chart for explaining the "forward" determination range in message setting processing 1 according to the embodiment of the present invention.

FIG. 18 is a view for explaining the "forward" determination range in message setting processing 1 according to the embodiment of the present invention.

In FIG. 18, the other mobile station of interest is located at the center of a circle, and the 0° direction of that circle is the traveling direction of the own mobile station. The "forward" direction in message setting processing 1 is determined when the direction of the other mobile station of interest falls within the hatched angle range in FIG. 18, i.e., the range from 0° to 90° and from 270° to 360° (0°).

Figure 16:
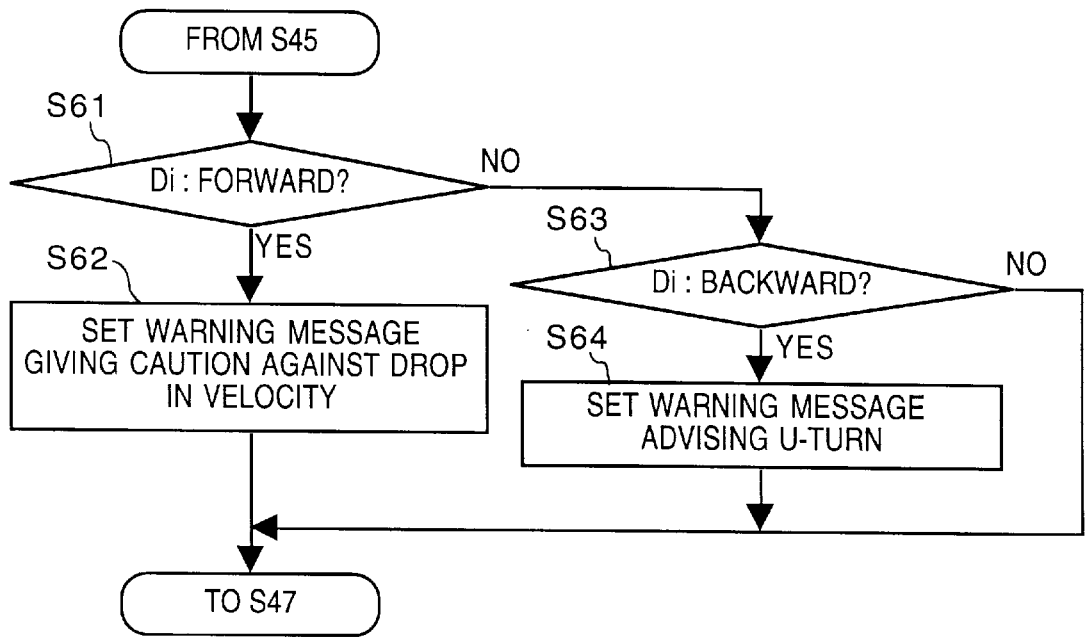
FIG. 16 is a flow chart showing message setting processing 2 in the communication state evaluation processing according to the embodiment of the present invention.

FIG. 16 is a flow chart showing message setting processing 2 in the communication state evaluation processing according to the embodiment of the present invention.

In FIG. 16, it is checked if the traveling direction Di of the other mobile station of interest is the forward direction (step S61). If YES in step S61, a predetermined code is set in a transmission buffer to generate a warning message giving caution against a drop in velocity in the other mobile station of interest (step S62), and the flow then advances to step S47. On the other hand, if NO in step S61, it is checked if the traveling direction Di of the other mobile station of interest is the backward direction (step S63). If YES in step S63, a predetermined code is set in the transmission buffer to generate a warning message advising a U-turn in the other mobile station of interest (step S64), and the flow then advances to step S47. On the other hand, if NO in step S64, i.e., if the traveling direction Di of the other mobile station of interest agrees with the 90° or 270° direction, the vehicle of interest is likely to reach the right- or left-end position soon, and a warning is set in message setting processing 3. For this reason, no warning is set in message setting processing 2, and the flow advances to step S47. The method of determining the "forward" and "backward" directions in message setting processing 2 will be explained below with reference to FIG. 19.

Figure 19:
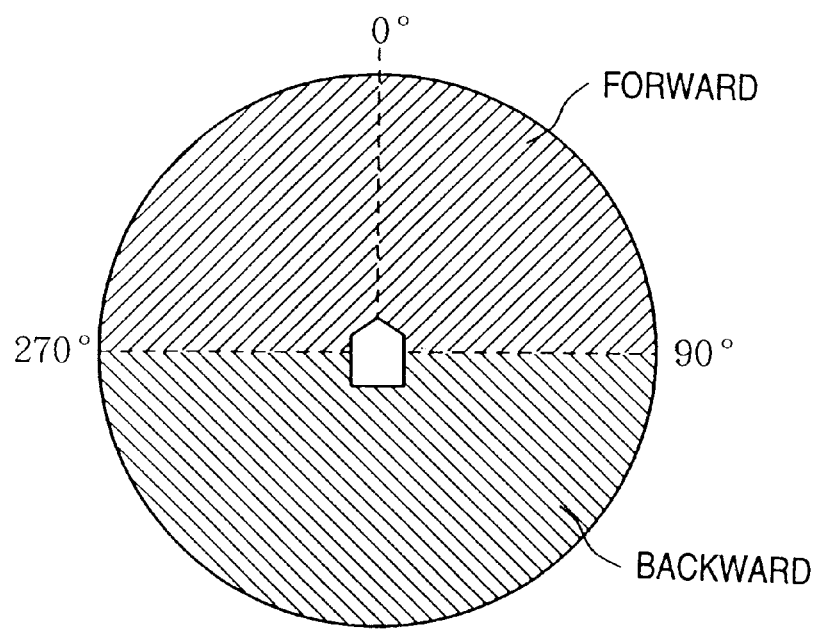
FIG. 19 is a chart for explaining the "forward" and "backward" determination ranges in message setting processing 2 according to the embodiment of the present invention.

FIG. 19 is a view for explaining the "forward" and "backward" determination ranges in message setting processing 2 according to the embodiment of the present invention.

In FIG. 19, the other mobile station of interest is located at the center of a circle, and the 0° direction of that circle is the traveling direction of the own mobile station. The "forward" direction in message setting processing 2 is determined when the direction of the other mobile station of interest falls within the former half hatched angle range in FIG. 19, i.e., the range from 0° to 90° and from 270° to 360° (0°). On the other hand, the "backward" direction is determined when the direction of the other mobile station of interest falls within the latter half hatched angle range in FIG. 19, i.e., the range from 90° to 270°.

FIG. 17 is a flow chart showing message setting processing 3 in the communication state evaluation processing according to the embodiment of the present invention.

In FIG. 17, it is checked if the traveling direction Di of the other mobile station of interest is the forward direction (step S71). If YES in step S71, a predetermined code is set in a transmission buffer to generate a warning message giving caution about the traveling interval in the other mobile station of interest (step S72), and the flow advances to step S49. On the other hand, if NO in step S71, it is checked if the traveling direction Di of the mobile station of interest is the outward direction (step S73). If YES in step S73, a predetermined code is set in the transmission buffer to generate a warning message advising a U-turn in the other mobile station of interest (step S74), and the flow advances to step S49. On the other hand, if NO in step S73, although the other mobile station of interest is located at the right- or left-end position in the own group, since it is traveling in a direction to approach the own mobile station, the flow advances to step S49. The method of determining the "forward", "outward", and "backward" directions in message setting processing 2 will be explained below with reference to FIG. 20.

Figure 20:
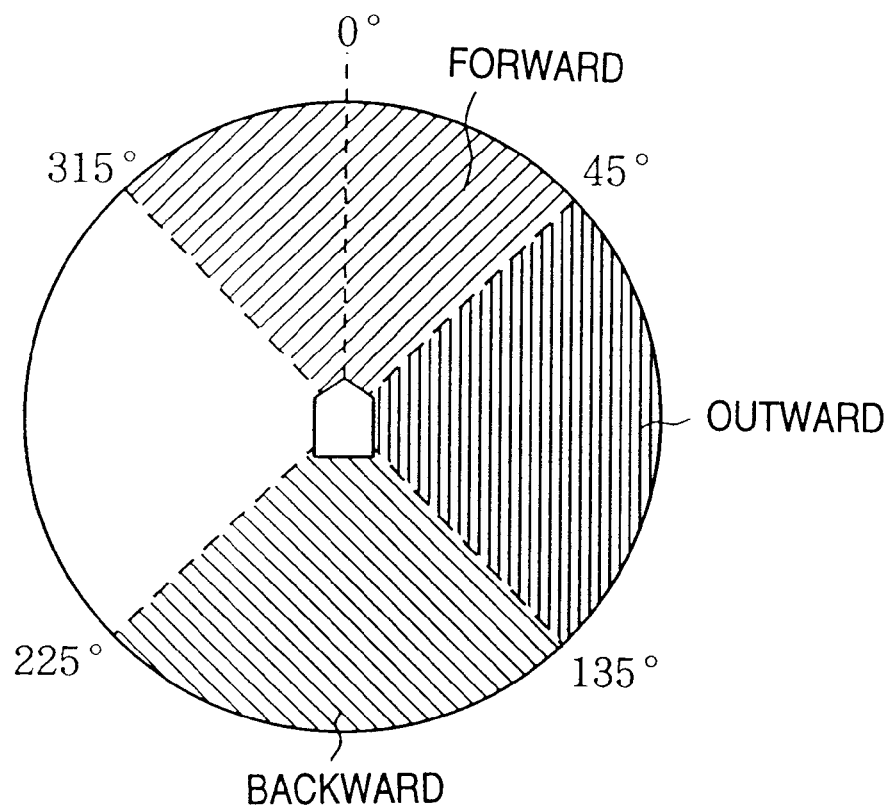
FIG. 20 is a chart for explaining the "forward", "backward", and "outward" determination ranges in message setting processing 3 according to the embodiment of the present invention.

FIG. 20 is a view for explaining the "forward", "backward", and "outward" determination ranges in message setting processing 3 according to the embodiment of the present invention.

In FIG. 20, the other mobile station of interest is located at the center of a circle, and the 0° direction of that circle is the traveling direction of the own mobile station. The "forward" direction in message setting processing 3 is determined when the direction of the other mobile station of interest falls within the upper hatched angle range in FIG. 20, i.e., the range from 0° to 45° and from 315° to 360° (0°). On the other hand, the "backward" direction is determined when the direction of the other mobile station of interest falls within the lower hatched angle range in FIG. 20, i.e., the range from 135° to 225°. Furthermore, when the other mobile station of interest is located at the right side of the own mobile station, the "outward" direction is determined when the direction of the other mobile station of interest falls within the right hatched angle range in FIG. 20, i.e., the range from 45° to 135°. On the other hand, when the other mobile station of interest is located on the left side of the own mobile station, the "outward" direction is determined when the direction of the other mobile station of interest falls within the left blank range in FIG. 20.

The angle ranges shown in FIGS. 18 to 20 are merely examples, and the present invention is not limited to these specific ranges.

Modification of Communication State Evaluation Between Mobile Stations

As a modification of the above-mentioned communication state evaluation between mobile stations, in place of steps S31 to S35 in the communication state evaluation using the evaluation formula K, the electric field strength Bi of the other mobile station of interest stored in the memory in step S16 in FIG. 6 may be compared with a predetermined value, which is registered in advance, and if the electric field strength Bi is smaller than the predetermined value, the processing in step S36 and the subsequent steps may be done.

Modification of Position Recognition Between Mobile Stations

Figure 21:
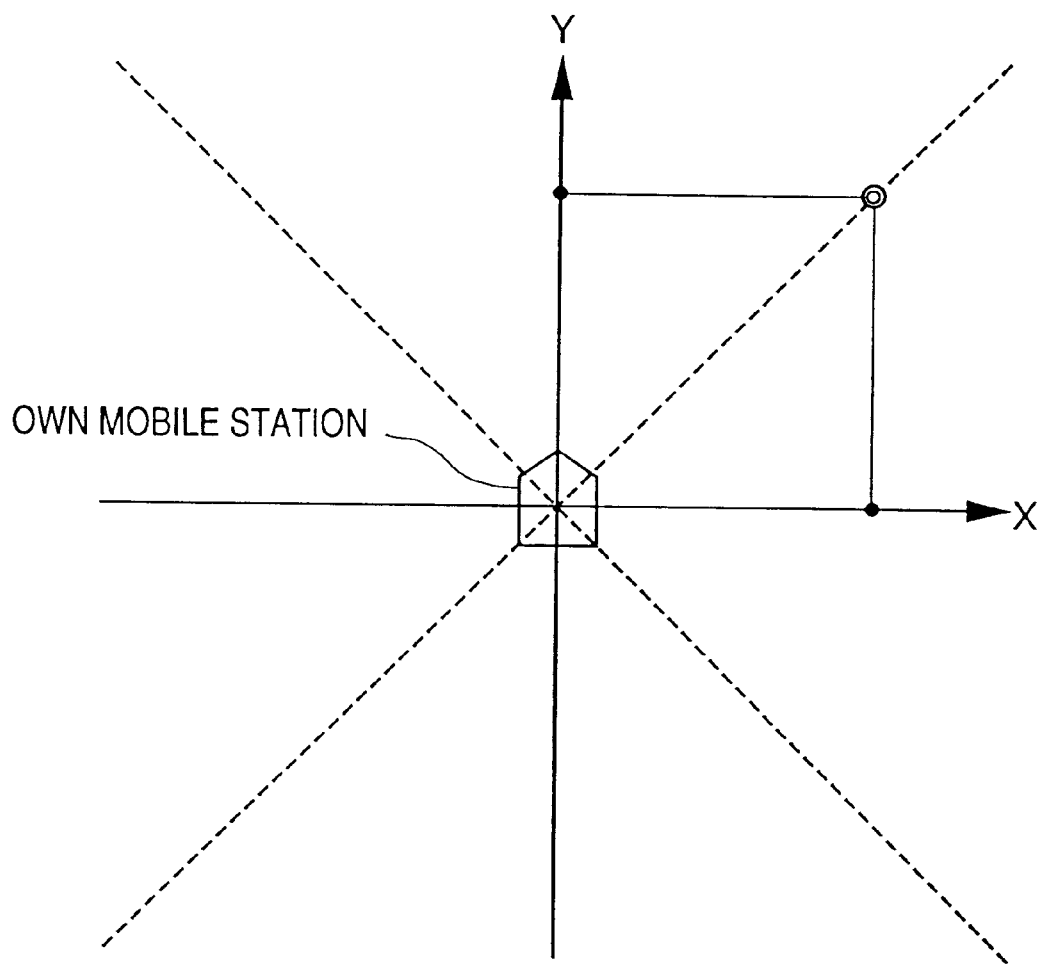
FIG. 21 is a chart for explaining a scheme for recognizing the positions of mobile stations as a modification of the embodiment of the present invention.

FIG. 21 is a view for explaining the position recognition scheme between mobile stations according to a modification of the embodiment of the present invention. As shown in FIG. 21, the positions of two other mobile stations (full dots) are respectively located on the X- and Y-coordinate axes, and have the same distance from the own mobile station. In the position recognition scheme between mobile stations described above with the aid of FIGS. 10 to 13, the "head", "tail", and "left-end and right-end" positions are used as the end portion positions in the own group for the sake of simplicity. In such a case, the other mobile station indicated by a double-circle in FIG. 21 are farther from the own mobile station than the two other mobile stations. In view of this problem, in a preferred embodiment, the end portion positions in oblique directions indicated by the broken lines are preferably detected by the same method as described above with reference to FIGS. 10 to 13.

In the above embodiment, a message to the operator by means of a voice output from the voice guide loudspeaker 6 or a display on the display 8 need not be generated separately, and both audible and visual messages may be used appropriately.

Also, the input operation of the operator to the navigation apparatus is not limited to that from the operation switch 10, but an instruction via voice recognition may be appropriately used together.

Information associated with the vehicle velocity may be calculated based on the moving amount of position information per unit time obtained by the GPS function.

As described above, according to the present invention, a navigation apparatus to which a radio communication equipment is connected, and which can prevent radio communications between mobile stations that mount the navigation apparatus from being disrupted, and its navigation method, can be provided. With this apparatus and method, before the positional relationship between mobile stations falls outside the radio communication range to disconnect radio communications, an appropriate instruction corresponding to the moving state of the mobile station of interest can be given to that mobile station of interest alone, the moving state of which is to be changed.

As many apparently widely different embodiments of the present invention can be made without departing from the spirit and scope thereof, it is to be understood that the invention is not limited to the specific embodiments thereof except as defined in the appended claims.

What is claimed is:

1. A navigation apparatus to which radio communication means for performing a radio communication between mobile stations is connected, comprising:

first position recognition means for recognizing a current position of an own mobile station that mounts an own navigation apparatus on the basis of received GPS signal:

current position transmitting means for transmitting the current position of the own mobile station recognized by said first position recognition means via said radio communication means;

second position recognition means for recognizing a current position of an other mobile station that mounts an own navigation apparatus on the basis of radio signal received by said radio communication means;

electric field strength detection means for detecting an electric field strength of the radio signal received from the other mobile station by the radio communication means;

display means for displaying the recognized current positions of the own mobile station and the other mobile station together with stored map information; and warning means for generating a warning when the electric field strength detected by said electric field strength detection means is smaller than a predetermined value.

2. A navigation apparatus to which radio communication means for performing a radio communication between mobile stations is connected, comprising:

distance detection means for detecting a distance between an own mobile station and another mobile station on the basis of information associated with the own mobile station that mounts an own navigation apparatus, and information associated with the other mobile station received by the radio communication means;

warning means for generating a warning when the distance detected by said distance detection means becomes larger than a predetermined value;

electric field strength detection means for detecting an electric field strength of a radio signal received from the other mobile station by the radio communication means; and electric field strength correction means for correcting the predetermined value to be smaller as the electric field strength detected by said electric field strength detection means becomes smaller.

3. A navigation apparatus to which radio communication means for performing a radio communication between mobile stations is connected, comprising:

distance detection means for detecting a distance between an own mobile station and another mobile station on the basis of information associated with the own mobile station that mounts an own navigation apparatus, and information associated with the other mobile station received by the radio communication means;

warning means for generating a warning when the distance detected by said distance detection means becomes larger than a predetermined value;

relative velocity detection means for detecting a relative velocity between the own mobile station and the other mobile station on the basis of the information associated with the own mobile station and the information associated with the other mobile station; and relative velocity correction means for correcting the predetermined value to be smaller as the relative velocity detected by said relative velocity detection means becomes larger in a direction in which the own mobile station and the other mobile station move away from each other.

4. A navigation apparatus to which radio communication means for performing a radio communication between mobile stations is connected, comprising:

first position recognition means for recognizing a current position of an own mobile station that mounts an own navigation apparatus on the basis of received GPS signal;

current position transmitting means for transmitting the current position of the own mobile station recognized by said first position recognition means via said radio communication means;

second position recognition means for recognizing a current position of an other mobile station that mounts an own navigation apparatus on the basis of radio signal received by said radio communication means;

distance detection means for detecting a distance between the own mobile station and the other mobile station on the basis of the current positions of the own mobile station and the other mobile station recognized by said first and second position recognition means;

display means for displaying the recognized current positions of the own mobile station and the other mobile station together with stored map information; and warning means for generating a warning when the distance detected by said distance detection means becomes larger than a predetermined value.

5. The apparatus according to claim 4, further comprising:

electric field strength detection means for detecting an electric field strength of a radio signal received from the other mobile station by the radio communication means; and electric field strength correction means for correcting the predetermined value to be smaller as the electric field strength detected by said electric field strength detection means becomes smaller.

6. The apparatus according to claim 4, further comprising:

relative velocity detection means for detecting a relative velocity between the own mobile station and the other mobile station on the basis of the information associated with the own mobile station and the information associated with the other mobile station; and relative velocity correction means for correcting the predetermined value to be smaller as the relative velocity detected by said relative velocity detection means becomes larger in a direction in which the own mobile station and the other mobile station move away from each other.

7. The apparatus according to claim 4, wherein said second position recognition means recognizes the current position of the other mobile station on the basis of the received radio signal transmitted by said current position transmitting means of the other mobile station.

8. The apparatus according to claim 4, further comprising:

own mobile station end portion detection means for detecting, on the basis of the recognized current positions of the own mobile station and the other mobile station, if the own mobile station is located at an end portion in a group including the own mobile station and the other mobile station, and wherein, when said own mobile station end portion detection means detects that the own mobile station is located at the end portion, said warning means generates a warning in the own mobile station.

9. The apparatus according to claim 8, further comprising:

warning content changing means for changing contents of the warning in accordance with a position of the end portion when the own mobile station is located at the end portion in the group.

10. The apparatus according to claim 8, further comprising:

other mobile station end portion detection means for detecting, on the basis of the recognized current positions of the own mobile station and the other mobile station, if the other mobile station is located at an end portion in the group including the own mobile station and the other mobile station, and wherein, when said other mobile station end portion detection means detects that the other mobile station is located at the end portion, said warning means controls the radio communication means to transmit information associated with a warning to the other mobile station.

11. The apparatus according to claim 10, further comprising:

first transmission content changing means for changing contents of the information to be transmitted associated with the warning in accordance with a position of the end portion when the other mobile station is located at the end portion in the group.

12. The apparatus according to claim 11, further comprising:

direction detection means for detecting a direction of the other mobile station with respect to the own mobile station on the basis of the information associated with the own mobile station and the information associated with the other mobile station; and second transmission content changing means for changing contents of the information to be transmitted associated with the warning in correspondence with the direction of the other mobile station detected by said direction detection means when the other mobile station is located at the end portion in the group.

13. The apparatus according to claim 11, further comprising:

direction detection means for detecting a direction of the other mobile station with respect to the own mobile station on the basis of the information associated with the own mobile station and the information associated with the other mobile station; and transmission inhibition means for inhibiting transmission of the information to be transmitted associated with the warning when the direction of the other mobile station detected by said direction detection means agrees with a direction toward the own mobile station.

14. A navigation apparatus to which radio communication means for performing a radio communication between mobile stations is connected, comprising:

distance detection means for detecting a distance between an own mobile station and another mobile station on the basis of information associated with the own mobile station that mounts an own navigation apparatus, and information associated with the other mobile station received by the radio communication means;

warning means for generating a warning when the distance detected by said distance detection means becomes larger than a predetermined value;

position recognition means for recognizing positions of the own mobile station and the other mobile station on the basis of the information associated with the own mobile station and the information associated with the other mobile station; and own mobile station end portion detection means for detecting, on the basis of a position recognition result of said position recognition means, if the own mobile station is located at an end portion in a group including the own mobile station and the other mobile station, and wherein when said own mobile station end portion detection means detects that the own mobile station is located at the end portion, said warning means generates a warning in the own mobile station.

15. The apparatus according to claim 14, further comprising:

warning content changing means for changing contents of the warning in accordance with a position of the end portion when the own mobile station is located at the end portion in the group.

16. The apparatus according to claim 14, further comprising:

position recognition means for recognizing positions of the own mobile station and the other mobile station on the basis of the information associated with the own mobile station and the information associated with the other mobile station; and other mobile station end portion detection means for detecting, on the basis of a position recognition result of said position recognition means, if the other mobile station is located at an end portion in the group including the own mobile station and the other mobile station, and wherein when said other mobile station end portion detection means detects that the other mobile station is located at the end portion, said warning means controls the radio communication means to transmit information associated with a warning to the other mobile station.

17. The apparatus according to claim 16, further comprising:

first transmission content changing means for changing contents of the information to be transmitted associated with the warning in accordance with a position of the end portion when the other mobile station is located at the end portion in the group.

18. The apparatus according to claim 17, further comprising:

direction detection means for detecting a direction of the other mobile station with respect to the own mobile station on the basis of the information associated with the own mobile station and the information associated with the other mobile station; and second transmission content changing means for changing contents of the information to be transmitted associated with the warning in correspondence with the direction of the other mobile station detected by said direction detection means when the other mobile station is located at the end portion in the group.

19. The apparatus according to claim 17, further comprising:

direction detection means for detecting a direction of the other mobile station with respect to the own mobile station on the basis of the information associated with the own mobile station and the information associated with the other mobile station; and transmission inhibition means for inhibiting transmission of the information to be transmitted associated with the warning when the direction of the other mobile station detected by said direction detection means agrees with a direction toward the own mobile station.

* * * * *

UNITED STATES PATENT AND TRADEMARK OFFICE
CERTIFICATE OF CORRECTION

PATENT NO.:     6,002,345
DATED     :     December 14, 1999
INVENTOR(S):    Hiroshi OHMURA, et al.

It is certified that error appears in the above-identified patent and that said Letters Patent is hereby corrected as shown below:

Column 5,   line 19, delete "-".

Column 9,   line 40, change "station" to --stations--.

Column 14,  line 11 (claim 1), change ":" to --;--.

Signed and Sealed this

Twentieth Day of February, 2001

Attest:

NICHOLAS P. GODICI

*Attesting Officer*     *Acting Director of the United States Patent and Trademark Office*